United States Patent [19]

Brändström

[11] 4,322,577
[45] Mar. 30, 1982

[54] CRYPTOSYSTEM

[76] Inventor: Hugo Brändström, 22 Johan Enbergs väg, Solna, Sweden, S-171 91

[21] Appl. No.: 154,403

[22] PCT Filed: Dec. 20, 1978

[86] PCT No.: PCT/SE78/00100
§ 371 Date: Aug. 21, 1979
§ 102(e) Date: Aug. 21, 1979

[87] PCT Pub. No.: WO79/00418
PCT Pub. Date: Jul. 12, 1979

[30] Foreign Application Priority Data

Dec. 21, 1977 [SE] Sweden .................. 7714587

[51] Int. Cl.³ ............................................. H04L 9/00
[52] U.S. Cl. ............................. 178/22.05; 178/22.07
[58] Field of Search ............... 178/22, 22.05, 22.06, 178/22.07; 375/2

[56] References Cited

U.S. PATENT DOCUMENTS

| 3,798,359 | 3/1974 | Feistel | 178/22 |
| 4,074,066 | 2/1978 | Ehrsam | 178/22 |
| 4,160,120 | 7/1979 | Barnes et al. | 375/2 |

Primary Examiner—Howard A. Birmiel
Attorney, Agent, or Firm—Cushman, Darby & Cushman

[57] ABSTRACT

Encryption and decryption of information of a message is performed by partitioning a plaintext message into blocks of binary digits and by further partitioning said blocks into subblocks which are interpreted as elements in a Galois-field. A plaintext matrix (M) of said elements is multiplied by a first key matrix (A) of a group over said Galois-field, the resulting product M·A being multiplied by a second key matrix (B) of the same group over said Galois-field. The final product (B·M·A) thus received constitutes the encrypted message block (K). Decryption is performed by multiplying the transmitted product (B·M·A) by inverse key matrices ($A^{-1}$, $B^{-1}$) generated by the same keys (a, b) as used for decryption and taken in the proper order. (FIG. 2)

9 Claims, 5 Drawing Figures

CRYPTOSYSTEM

TECHNICAL FIELD

The present invention relates in general to cryptography. More specifically the invention provides a cryptosystem including apparatus and methods for encryption and decryption of data using one or more encryption keys and using the same keys for decryption.

The cryptosystem shall can work according to the principles for ciphers dependent or independent of the unenciphered text (the plaintext).

The cipher independent of the plaintext is distinguished by a usually very long sequence of key symbols, consisting of zeros and ones, being added modulo-2 to the plaintext which is also a sequence of zeros and ones.

BACKGROUND ART

As an example ciphers independent of plaintext, there exist form ciphers in which the complete sequence of key symbols constitutes the key. This kind of encryption, for example, has been implemented by defense organizations. The drawback of a form cipher is that keys are comsumed at the same rate as that of the information being transmitted. Also, the keys which may be stored on a disc memory both at the transmitter end and at the receiver end of a communication channel over which ciphered information is transmitted, has to be deposited for safe-keeping.

In order to eliminate the circumstantial handling of keys when form ciphers are being used, the key sequences are often generated by use of feedback shift registers. The sequences of zeros and ones generated by such a shift register have a quality that makes them very similar to randomly generated sequences, and they are often called pseudo-random sequences. Such a sequence is completely determined by the values stored in the snift register at the start. These shift register valves are referred to in the following discussion as the "key". Thereby, the key will be very short in comparison with the key sequences generated by the shift register, thus considerably simplifying the handling of the key as compared to corresponding problems of handling the longer key sequences normally associated with a form cipher.

However, one drawback attends the use of a feedback shift register. It is too easy to break the code and decipher the enciphered information. If a part of the plaintext and the corresponding enciphered text are known, the length of which needs only be two times the length of the shift register, the key may be determined by solving a system of linear equations.

Different ways have been considered to introduce non-linear operations upon the bits in the key sequence generated by a feedback shift register in order to increase the difficulty in breaking the code. For this purpose, more than one shift register may be used for enabling the connecting together of the outputs of different registers in a non-linear way for the generation of a new key sequence to be used in modulo-2 additions of the symbols in the plaintext.

It may be proved mathematically that the key sequence generated in such a way in most cases may be generated by an equivalent linear shift register. Therefore, it is always difficult to guarantee sufficient resistance against code breaking when such methods are used.

In order to obtain a high resistance to code breaking, it is therefore necessary to use ciphers which are dependent on the plaintext. One such cipher developed by the International Business Machines Corporation (IBM) in the U.S.A. to be used by the Federal authorities in U.S.A. according to Federal Information Processing Standards Publication No. 46, Jan. 15, 1977 has been suggested by the National Bureau of Standards (NBS) in the U.S.A. This cryptological standard is denoted Data Encryption Standard (DES). It is shown in FIG. 1 of the present specification.

According to this system the plaintext is partitioned into blocks M consisting of 64 bits. These bits are, as a first step, permuted according to a fixed permutation schedule which is a function of 16 key words $K_1, K_2 \ldots K_{16}$ defined by a KEY consisting of 64 bits, 8 of which are parity check bits. After permutation a block is partitioned into two smaller blocks, a left block $L_0$ and a right block $R_0$, each smaller block consisting of 32 bits. After partitioning, the blocks are subjected to an iteration process of 16 steps, defined by the relations $$L_n = R_{n-1}$$

$$R_n = L_{n-1} + f(R_{n-1}, K_n)$$

$$n = 1, 2 \ldots 16$$

where f is a non-linear function mapping $R_{n-1}$ and the keyword $K_n$ into a 32-bits block which is added modulo-2 to $L_{n-1}$. The keyword $K_n$ consists of 48 bits and is a function of KEY and the iteration step n defined by a function KS $$K_n = KS(n, \text{KEY}).$$

In the last step $L' = R_{16}$ and $R' = L_{16}$ are combined into a 64-bits block $$M' = L'R'$$

which is subjected to a permutation defined to be the inverse of the permutation of M as discussed earlier. As a result of this last permutation an enciphered block KB is obtained.

Decryption is effectuated by passing KB through an identical device with the same key KEY, but in order to obtain the correct order with $$K_n = KS(17 - n, \text{KEY}).$$

Each bit of the enciphered block KB is a function of all the bits in the plaintext block M. The DES system provides a relatively high resistance against breaking the ciphertext since the only way known today for breaking it is to try different keys in a decryption device, and to look for meaningfull plaintexts in the outputs when the enciphered blocks are applied to the inputs. The number of possible keys KEY is $2^{56}$, or about $10^{17}$.

The DES system also permits high rates of encryption and decryption since the apparatus can be fabricated in hardware using LSI chips, and these chips are already available on the market.

In spite of these qualities the DES system has been critized in several instances (cf. the "Communications of the ACM" vol. 19 (1976): 3, March, pp. 164 to 165). This criticism maintains that the resistivity to breaking a code will not be sufficient in the future (about the year 1990), depending on the rapid development of minicomputers and microcomputers and the downward trends of the costs of computations. Before the year 1990 it might be necessary to change the standard crypto, requiring heavy expenses and much labour. The DES system is not sufficiently flexible in this respect, which is also a disadvantage in another respect: it will not be possible to adjust it to fit special applications.

Another problem which is inherent in all plaintext dependent crypto systems proposed until now is that a one-bit-error in the transmission of the enciphered block normally implies that all the bits in the deciphered block will be affected. This might possibly be tolerated if a purely linguistic message is transmitted, but can not be tolerated if the message includes numerical data.

One way to avoid this drawback is to let the plaintext block contain a password which has to be identified by the receiver before the block is approved.

As a summary of drawbacks of known crypto systems connected to data communication or data storing it may be established that:

1. Plaintext independent ciphers have low resistivity against breaking. Form ciphers constitute an exception. However, they require extremely long key strings, the handling of which meets with difficulties.

2. Plaintext dependent ciphers as "stiff". They are rather expensive to change if the resistivity against breaking is regarded to be insufficient.

3. Plaintext dependent ciphers require passwords within the plaintext blocks in order that errors in the transmission caused by noise may be detected.

SUMMARY OF THE INVENTION

The object of the invention is to avoid said drawbacks of plaintext dependent ciphers as discussed above and to obtain a possibility of adapting the system to existing applications including databanks, data communication and speech communication.

According to the invention encryption is performed by partitioning the characters of a plaintext message into blocks of binary digits, each such block being further partitioned into subblocks, each of which can be interpreted as an element in a Galois-field. These elements are used to generate a plaintext matrix which is multiplied from the right in a first matrix multiplier by a first key matrix belonging to a prescribed matrix group over the Galois-field and being generated by means of a first encryption key which is applied to a first matrix generator, the output of which is multiplied from the left in a second matrix multiplier by a second key matrix belonging to the same matrix group and being generated by means of a second encryption key which is applied to a second matrix generator. The output from the last-mentioned generator constitutes the encrypted plaintext block which is thereafter transmitted to a receiver where it is to be decrypted.

For the purpose of decryption the plaintext block is multiplied from the left in a third matrix multiplier by a third key matrix being the inverse of the second key matrix and being generated by means of the second encryption key which is applied to a third matrix generator. The output of the generator is then multiplied from the right in a fourth matrix multiplier by a fourth key matrix being the inverse of the first key matrix and being generated by means of the first encryption key which is applied to a fourth matrix generator. The output from said last-mentioned generator constitutes the restored original plaintext matrix, and after decoding the original plaintext block will be received.

Thus, in a simple way, the invention allows a receiver to decide if a received message is correctly received or not. Furthermore, the cryptosystem according to the invention is suitable as a means for encryption and decryption of both stored data and data used in communication. The system is readily realizable by means of integrated circuits.

The system according to the invention is further characterized by great resistivity against breaking, and it renders it possible to use fast algorithms for encryption and for decryption. The implementation is technically simple and inexpensive.

The demand for resistivity against breaking strongly depends on the actual application, but is especially high in connection with the processing of stored information, when in extreme cases it is necessary for the cryptosystem to resist breaking during 50 years, independently of the breakers access to technical facilities and to the unknown future development of technology.

Fast algorithms are especially important in connection with data communication where multiples of 9600 bits/s may be required, and in connection with digitalized speech communication where transmission rates of even more than 20,000 bits/s seem to be necessary. In computers connected to data terminals transmission rates of $10^6$ bits/s ($-1$ Mbits/s) are realistic values. The object of the present invention is further to make such applications possible.

The method of encryption and decryption according to the invention is founded on the use of matrices belonging to matrix groups with elements belonging to Galois-field. Accordingly, a short review will be given of the properties of such fields. Further information may be drawn from the book "An Introduction to Error-Correction Codes" by Shu Lin, Prentice-Hall, London.

A Galois-field ($GF(p^r)$) contains $p^r$ elements, where p is a prime number and r is an arbitrary positive integer. Two arbitrary elements in $GF(p^r)$ may be added or multiplied, and the result of such operations will be (usually other) elements in the field. A Galois-field also contains a unit as regards addition (denoted 0), implying that $0+a=a$ for all a in the field, and a unit as regards multiplication (denoted 1), implying that $1 \cdot a = a$ for all a in the field. For each a and b in a Galois-field the equation $a+x=b$ always has a solution in the field which is $x=b-a$. Also, for each $a \neq 0$ and each b in the Galois-field, the equation $a \cdot y = b$ always has a solution in the field which is $y=b/a$. The set of elements differing from 0 in the Galois-fields has the character of a cyclic group implying that each such element in the field can be interpreted as a power of a generating element, also called a primitive element. Such an element is a root of an irreducible polynom of degree r with the coefficients belonging to the prime field $GF(p)$ in $GF(p^r)$. Such a polynom, the roots of which are primitive elements, is called a primitive polynom. Still another property of the Galois-field $GF(p^r)$ is that each element may be written as a polynom in $\alpha$ over $GF(p)$ of degree $r-1$. If $p=2$ and $r=4$ hence $x^4+x+1$ is a primitive polynom.

If u and v are two arbitrary elements in $GF(2^4)$ none of which equals 0, and if $$u = x_0 + x_1 \cdot \alpha + x_2 \cdot \alpha^2 + x_3 \cdot \alpha^3 \quad x_i = 0 \text{ or } 1$$

$$v = y_0 + y_1 \cdot \alpha + y_2 \cdot \alpha^2 + y_3 \cdot \alpha^4 \quad y_j = 0 \text{ or } 1$$

and if $u=\alpha^{n1}$ and $v=\alpha^{n2}$ then $u \cdot v=\alpha^{n1+n2}$, also belonging to $GF(2^4)$.

This implies that $u \cdot v = z_0 + z_1 \cdot \alpha + z_2 \cdot \alpha^2 + z_3 \cdot \alpha^3$.

The coefficients $z_0$, $z_1$, $z_2$ and $z_3$ are bilinear expressions in $x_i$ and $y_j$, where i and j assume values 0, 1, 2, or 3.

According to the invention the addition and multiplication rules for the elements in $GF(p^r)$ are used when matrices of order n (the number of rows and of columns is equal to n) are multiplied.

The "general linear group" $GL(n,p^r)$ of order n over the Galois-field $GF(p^r)$ consists of all the non-singular matrices. This group contains a number of subgroups. One such subgroup of special interest in connection with the present invention is the "special linear group" $SL(n,p^r)$ which consists of all determinants which are equal to 1.

As an example, let us consider the binary field which is a realization of GF(2). There exist exactly 16 matrices of order n=2 over this field, 6 of which being non-singular. In this case the "general linear group" GL(2,2) and the "special linear group" SL(2,2) coincide. The six matrices in SL(2,2) are $$\begin{pmatrix} 0 & 1 \\ 1 & 0 \end{pmatrix}, \begin{pmatrix} 0 & 1 \\ 1 & 1 \end{pmatrix}, \begin{pmatrix} 1 & 0 \\ 0 & 1 \end{pmatrix}, \begin{pmatrix} 1 & 0 \\ 1 & 1 \end{pmatrix}, \begin{pmatrix} 1 & 1 \\ 0 & 1 \end{pmatrix} \text{ and } \begin{pmatrix} 1 & 1 \\ 1 & 0 \end{pmatrix}$$

Expressing these matrices in hexadecimal form will give, for instance, 6, 7, 9, B, D and E, respectively. They constitute a group (which is isomorphic to the symmetric group $S_3$). This implies that the product of two arbitrary matrices in this set of six matrices also belongs to the same set. As an example, we get $6 \cdot 7 = D$. By storing in a ROM or PROM memory in the multiplication table of matrices intended to be used in a cryptosystem according to the present invention, the product of matrices is easily obtained by a table-look-up routine.

As mentioned before, the invention utilizes matrices belonging to a certain matrix group. A plaintext is partitioned into blocks consisting of strings of elements in a Galois-field $GF(p^r)$ or a bit string. These blocks will then define a plaintext matrix. A key may also be looked upon as a block consisting of a string of elements defining in the same way a key matrix. By multiplying the plaintext matrix with at least two key matrices a crypto matrix will be received and will be able to be transmitted to the receiver.

BRIEF DESCRIPTION OF THE DRAWINGS

The invention will in the following be further described in connection with the Figures on the accompanying drawings. On the drawings.

DETAILED DESCRIPTION OF THE PREFERRED EMBODIMENT

Figure 1:
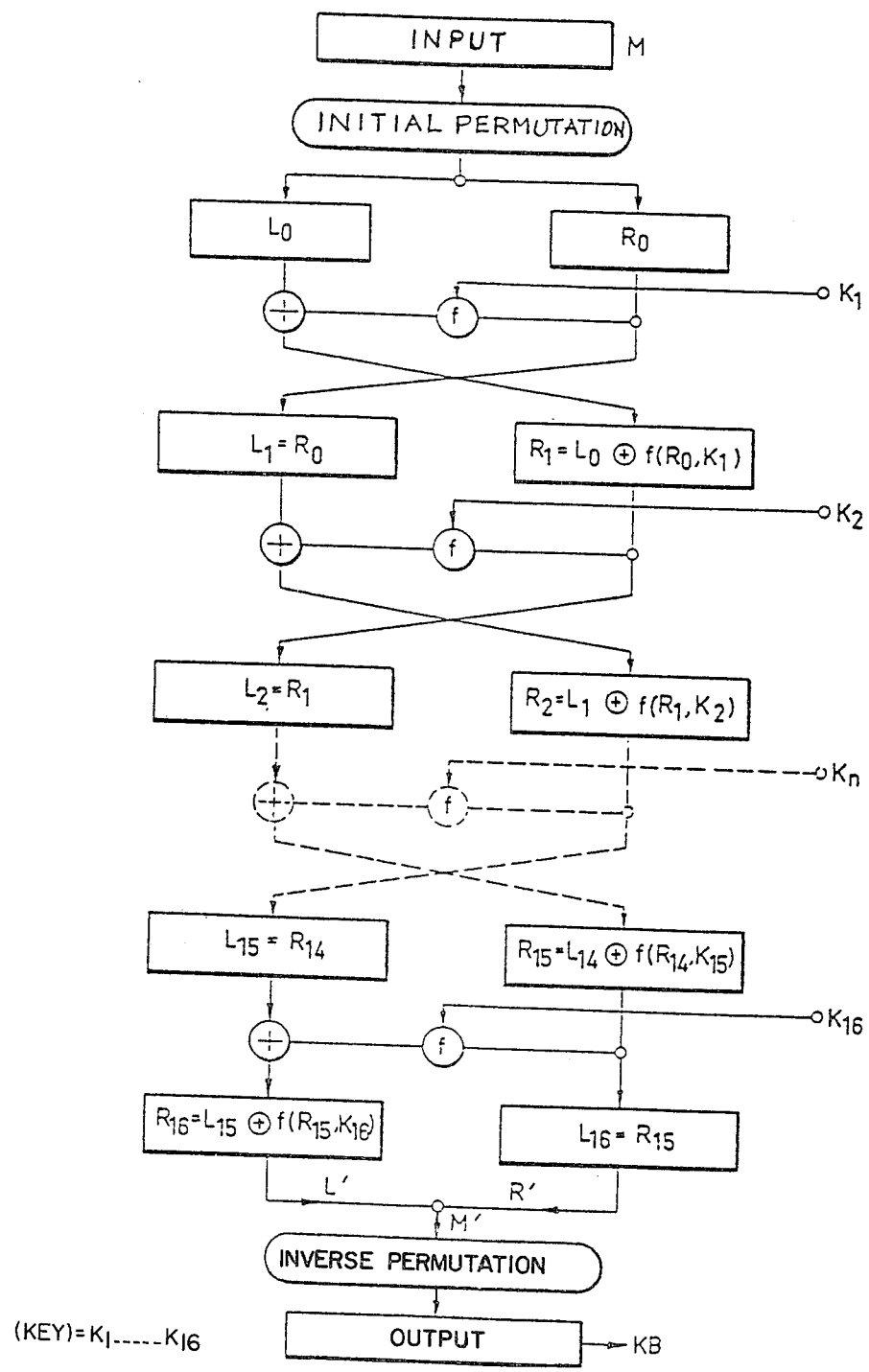
FIG. 1 illustrates an already known and above described standardized cipher system from the U.S.A.
Figure 2:
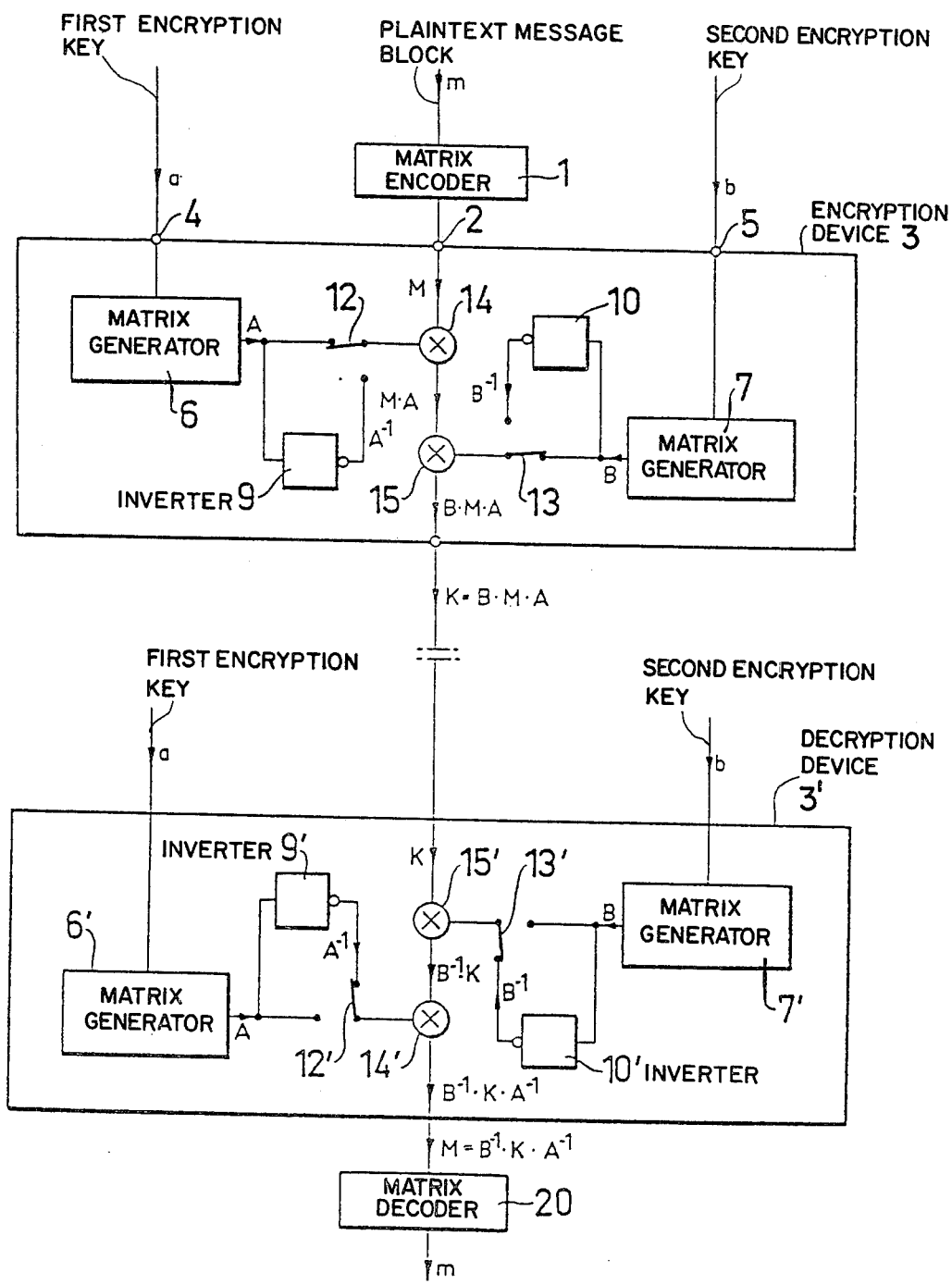
FIG. 2 shows a block diagram of an encryption and decryption system

The block diagram of FIG. 2 shows a plaintext message applied as blocks m consisting of, for example, data bits to a matrix encoder 1. The output of the encoder delivers a matrix M for each block m. The elements in the matrix M belong to a Galois-field as described above.

The matrix M is supplied to a first input 2 of an encryption device 3. Before that a first cipher key a consisting of data bits has been supplied to a second input 4 of the device, and a second cipher key b to a third input 5 of the same device.

If each key a and b consists of 16 bits a key can assume $2^{16}$ or 65,536 different values. In the most simple embodiment of the invention one will obtain $2^{32} = 4,294,967,304$, or about $4 \cdot 10^9$ different combinations of key values a and b. If two repeated encryptions are executed with two sets of keys $a_1$, $b_1$ and $a_2$, $b_2$ one will obtain $2^{64}$ or about $1.6 \cdot 10^{19}$ different combinations of key values. It is practically impossible to break such an ecrypted message using search routines to find the correct keys.

Each cipher key is supplied to a device 6 and 7, respectively for the generation of key matrices. One embodiment for the realization of such a device will be explained in connection with FIG. 3.

Figure 3:
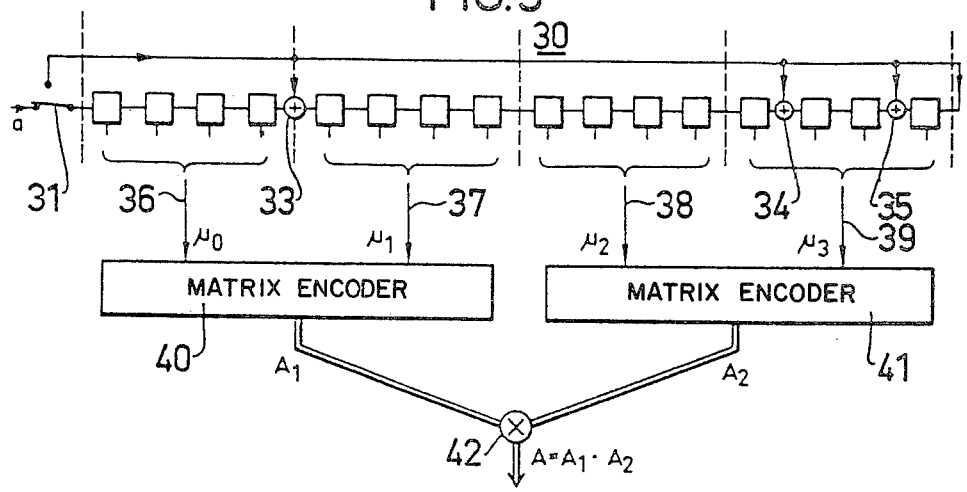
FIGS. 3 and 4 show diagrammatically two shift register circuits for use in connection with the system according to FIG. 2.

FIG. 3 diagrammatically illustrates a key matrix generator utilizing a Galois-field with p=2 and r=4. A key a consisting of 16 bits passes via a switch 31 into a shift register 32 having 16 positions. After that the switch 31 is switched over to the not shown position, and becomes fed back and will be able, at the outputs of each step, to generate a pseudorandom sequence of maximal length. In the example chosen a feedback is used corresponding to the primitive polynom $x^{16} + x^{12} + x^3 + x + 1$, defining the modulo-2 addition of the positions 33, 34 and 35. The outputs from each step in the shift register are grouped together into a tetrade $\mu_0$, $\mu_1$, $\mu_2$, $\mu_3$ each consisting of four bits as indicated by the arrows 36, 37, 38 and 39. The elements $\mu_i$ may be used to generate addresses to two matrices having elements in a Galois-field, or they mey be considered as elements in the Galois-field CF(16). Said last case is shown here. The four elements $\mu_i$ in the tetrade are supplied two by two to two matrix encoders 40, 41. The encoder 40 generates the matrix $A_1$ and the encoder 41 generates the matrix $A_2$. These matrices may, for example, be $$A_1 = \begin{pmatrix} 1 & \mu_0 \\ \mu_1 & 1 + \mu_0\mu_1 \end{pmatrix} \text{ and } A_2 = \begin{pmatrix} 1 & \mu_2 \\ u_3 & 1 + \mu_2\mu_3 \end{pmatrix}$$

The matrix encoders 40 and 41 may be replaced by a single matrix encoder having two outputs $A_1$ and $A_2$ for the matrices. These matrices are supplied to a matrix multiplier 42 the output of which will give the product $A = A_1 \cdot A_2$. Alternatively, also the matrix encoder 42 may be a part of a common matrix encoder 40, 41.

All three matrices A, $A_1$, $A_2$ belong to the "special linear group" SL(2, 16) as discussed earlier.

For the purpose of the invention it is in the same way necessary to generate a second key matrix B. This is performed by means of a separate feedback shift register and a matrix encoder, processing the key b. In FIG. 2 the block 7 is intended for generating the key matrix.

Instead of using feedback shift registers to generate the key matrices the tetrade $\mu_i$ may also be generated by random using a noise generator.

If the matrix A is used for encryption its inverse $A^{-1}$ is needed for decryption. The inverse matrix may either be obtained by multiplying inverted submatrices ($A^{-1} = A_2^{-1} \cdot A_1^{-1}$), or a separate inverter 9, 10, according to FIG. 2, may be used on which one input is connected to the output of a matrix encoder. By means of a change-over switch 12, 13 between the matrix encoder and its multiplier either the output of the matrix encoder may be directly connected to the multiplier (generating the matrix A or the matrix B) or the same output may be connected to the multiplier via the inverter 9, 10 (generating the matrix $A^{-1}$ and the matrix $B^{-1}$).

As can be seen from FIG. 2 the plaintext matrix M is supplied to a first input on a first matrix multiplier 14. To a second input on the multiplier the first key matrix A is supplied. In the embodiment shown the key matrix A is multiplied from the right to give the product M·A which has the form of a matrix and which is supplied to a first input on a second matrix multiplier 15. To a second input on said multiplier 15 the second key matrix B is supplied. Due to the multiplication order in the first matrix multiplier 14, the multiplication in the second matrix multiplier 15 requires the second key matrix B to be multiplied from the left to generate the product $K = B \cdot M \cdot A$, said product giving the encrypted matrix.

Decryption of the encrypted matrix is performed in an identical cipher device 3'. The only difference between the cipher device 3 and this further cipher device 3' is that in the latter the change-over switches 12' and 13' are arranged to supply the inverse key matrices $A^{-1}$ and $B^{-1}$ to the matrix multipliers 14' and 15', respectively. The combined multipliers 15' and 14' will then generate the final result $M = B^{-1} \cdot K \cdot A^{-1}$. In a matrix decoder 20 the original plaintext block m will be recovered.

Figure 4:
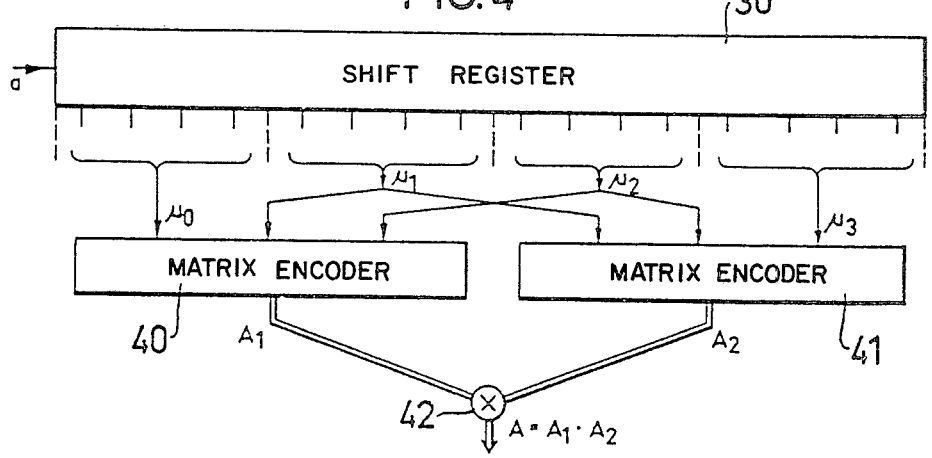

The invention does not require the limitation of generation of 2·2 matrices. Square matrices of arbitrary order n may be utilized. FIG. 4 exemplifies the generation of matrices of order 3 belonging to the "special linear group" SL(3,16) over a finite field (Galois-field) containing sixteen elements as shown in FIG. 4. In this embodiment the same shift register 30 is being used as in FIG. 3. The elements $\mu_1$ and $\mu_2$ in the tentrade according to FIG. 3 will appear in both the matrices $A_1$ and $A_2$. Considering the elements $\mu_i$ in the tetrade as elements in the Galois-field GF(16) and putting $$A_1 = \begin{pmatrix} 1 & 0 & 0 \\ \mu_0 & 1 & 0 \\ \mu_1 & \mu_2 & 1 \end{pmatrix} \text{ and } A_2 = \begin{pmatrix} 1 & \mu_1 & \mu_2 \\ 0 & 1 & \mu_3 \\ 0 & 0 & 1 \end{pmatrix}$$

as well $A_1$ as $A_2$ will belong to the "special linear group".

These matrices are easily inverted, offering a convenient possibility of generating the inverse of the matrix $A = A_1 \cdot A_2$. The appearence of the submatrices $A_1^{-1}$ and $A_2^{-1}$ is shown below in the formula of the inverse matrix $A^{-1}$.

$$A^{-1} = A_2^{-1} \cdot A_1^{-1} = \begin{pmatrix} 1 & -\mu_1 & -\mu_2 + \mu_1 \cdot \mu_3 \\ 0 & 1 & -\mu_3 \\ 0 & 0 & 1 \end{pmatrix} \cdot$$

$$\begin{pmatrix} 1 & 0 & 0 \\ -\mu_0 & 1 & 0 \\ -\mu_1 + \mu_2 \cdot \mu_0 & -\mu_2 & 1 \end{pmatrix}$$

Figure 5:
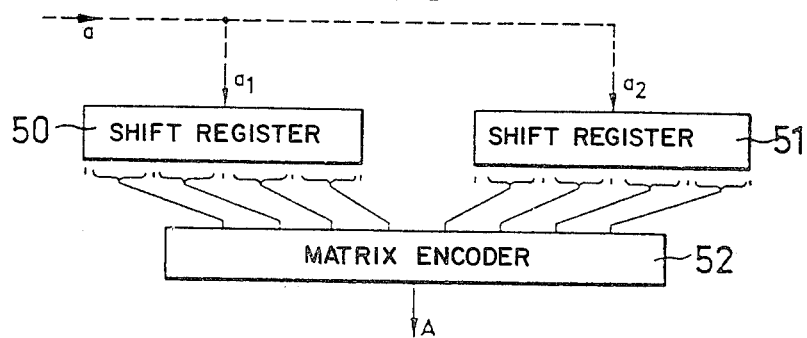
FIG. 5 shows diagrammatically how two shift registers may be connected to cooperate.

FIG. 5 shows an embodiment using two shift registers 50 and 51 to generate a key matrix A. A key a may be partitioned in an arbitrary way into two subkeys $a_1$ and $a_2$. Each one of them is supplied to one of the shift registers 50, 51, the registers being, if desired, of the type previously described. Outputs on the shift registers are connected to a matrix encoder 52 in such a way that an output thereon will generate a key matrix A.

Another modification of the invention may be used to increase the resistivity against breaking. This is obtained by making the cycle-time of the shift register a fraction 1/k of the rate by which the plaintext matrices M are supplied to the cipher device. In that way a key matrix consisting of the product of k consecutive matrices A will be generated. Said key matrix may then be utilized as a factor in the matrix multiplication with the plaintext matrix M.

The control of the processes in the cipher devices, in the matrix encoders and in the matrix decoders requires synchronization of the transmitter and the receiver by means of clock pulses, if necessary under the control of a microcomputer.

Matrices M generated during decryption have certain characteristic properties which may be the basis for checking the correctness of transmitted messages. A plaintext matrix may, for example, have the characteristic feature that its determinant is 1. It is also possible that a certain element in each plaintext matrix has a predefined value. These and other characteristics may easily be checked and identified.

Error detection and error correction is also, at least in principle, possible to perform before decryption. Let for example, the set S of plaintext matrices M to be used in a communication system be the set of singular 2·2 matrices over the Galois-field GF(16), i.e. the matrices, the determinant of which is zero. Then also $K = B \cdot M \cdot A$ will belong to S. However, the matrix K' received by the receiver may differ from the matrix K transmitted because of noise in the communication channel. Since all matrices have binary representation the Hamming distance between two arbitrary matrices is well defined. If K is non-singular an error will be detected, and one should look for a singular matrix K, the Hamming distance of which is as small as possible. This is quite analogous to the theory of linear codes. Some differences, however, exist, and the theory has to be developed further.

I claim:

1. A method for encrypting information characters of a message using encryption keys and for decrypting a message so encrypted, using the same keys, comprising the steps of:

(A) encrypting a plaintext message by the steps of
  (a) partitioning the characters of the plaintext message into blocks of binary digits;
  (b) partitioning each block into subblocks, the number of subblocks being the square of a natural number, the binary content of each subblock corresponding to an element of a Galois-field, the elements of the Galois-field corresponding to the different elements of a square plaintext matrix having an order equal to the natural number;

(c) generating by means of a first encryption key applied to a first matrix generator a first key matrix belonging to a prescribed matrix group over the Galois-field;
(d) multiplying, in a first matrix multiplier, the plaintext matrix by the first key matrix to form an output;
(e) generating by means of a second encryption key applied to a second matrix generator a second key matrix belonging to the same matrix group as the first key matrix;
(f) multiplying, in a second matrix multiplier, the output of the first matrix multiplier left by the second key matrix to form an output constituting an encrypted plaintext block;
(B) transmitting to a receiver the encrypted plaintext block;
(C) decrypting the received encrypted plaintext block by the steps of
(g) generating by means of the second encryption key applied to a third matrix generator a third key matrix
(h) multiplying the received encrypted plaintext block, in a third matrix multiplier by the third key matrix to form an output;
(i) generating by means of the first encryption key applied to a fourth matrix generator a fourth key matrix;
(j) multiplying the output of the third matrix multiplier in a fourth matrix multiplier by the fourth key matrix to form an output constituting a restored original plaintext matrix; and
(k) decoding the restored original plaintext matrix to provide a restored original plaintext block.

2. A method according to claim 1 further including repeating encrypting steps (A) using either the same encryption keys or different encryption keys; and repeating decrypting steps (C) a number of times corresponding to encrypting steps (A) using corresponding encryption keys.

3. Apparatus for encrypting information characters of a message using encryption keys and decryting a message so encrypted using the same keys comprising:
(A) means for encrypting a plaintext message including
(a) means for partitioning the characters of the plaintext message into blocks of binary digits;
(b) means for partitioning each block into subblocks, the number of subblocks being the square of a natural number and the binary content of each subblock corresponding to an element of a Galois-field, the elements of the Galois-field corresponding to the different elements of a square plaintext matrix having an order equal to the natural number;
(c) means for generating using a first encryption key applied to a first matrix generator, a first key matrix belonging to a prescribed matrix group over the Galois-field;
(d) means for multiplying in a first matrix multiplier the plaintext matrix by the first key matrix to form an output;
(e) means for generating with a second encryption key applied to a second matrix generator, a second key matrix belonging to the same matrix group as the first key matrix;
(f) means for multiplying in a second matrix multiplier, the output of the first matrix multiplier by the second key matrix to form an output constituting an encrypted plaintext block;
(B) means for transmitting the encrypted plaintext block to a receiver;
(C) means for decrypting the received encrypted plaintext block including
(g) means for generating by a second encryption key applied to a third matrix generator, a third key matrix;
(h) means for multiplying the received encrypted plaintext block in a third matrix multiplier from the left by the third key matrix to form an output;
(i) means for generating using the first encryption key applied to a fourth matrix generator, a fourth key matrix;
(j) means for multiplying the output of the third matrix multiplier in a fourth matrix multiplier by the fourth key matrix to form an output constituting a restored original plaintext matrix; and
(k) means for decoding the restored original plaintext matrix to provide a restored original plaintext block.

4. Apparatus for encrypting information characters of a message using encryption keys and for decrypting a message so encrypted, comprising:
(a) means for partitioning the characters of a plaintext message into blocks of binary digits;
(b) means for partitioning the blocks of binary digits into subblocks of binary digits, the number of subblocks being equal to the square of a natural number and the binary content of each subblock corresponding to an element of a Galois-field, the elements of the Galois-field corresponding to the different elements of a square plaintext matrix having an order equal to the natural number;
(c) first and second encryption keys;
(d) a first matrix generator adapted to receive the first encryption key, for generating a first key matrix belonging to a prescribed matrix group over the Galois-field;
(e) a second matrix generator adapted to receive the second encryption key, for generating a second key matrix belonging to the prescribed matrix groups;
(f) a first matrix multiplier for multiplying the plaintext message by the first key matrix to form an output;
(g) a second matrix multiplier for multiplying the output of said first matrix multiplier by the second key matrix to generate an output constituting an encrypted plaintext block;
(h) means for transmitting to a receiver the encrypted plaintext block;
(i) a third matrix generator adapted to receive the second encryption key for generating a third key matrix;
(j) a fourth matrix generator adapted to receive the first encryption key, for generating a fourth key matrix, the third and fourth key matrices being the inverse of the second and first key matrices, respectively;
(k) a third matrix multiplier for multiplying the received encrypted plaintext block by the third key matrix to form an output;
(l) a fourth matrix multiplier for multiplying the output of the third matrix multiplier by the fourth key matrix to form a restored original plaintext matrix;

(m) means for decoding the restored original plaintext matrix to provide a restored original plaintext block.

5. Apparatus according to claim 4 wherein the encryption keys comprise the outputs of shift registers and wherein the keys have a predetermined length corresponding to all of the stages of their corresponding shift registers being filled and wherein the shift registers are so connected and arranged that their output signals can can correspond to a string of elements in the Galois-field, these elements being supplied to their respective matrix generators for generating key matrices.

6. Apparatus according to claim 5 wherein a shift register and its corresponding matrix generator are combined in a single unit.

7. Apparatus according to claim 4 wherein each key matrix is supplied from its corresponding matrix generator to its corresponding matrix multiplier via one of two parallel paths, one such path comprising an inverter, the paths being switch selectable.

8. Apparatus according to claim 4, 5, 6 or 7 wherein the encryption keys, matrix multipliers, and matrix generators and associated connecting circuitry are fabricated as a single integrated circuit or to form part of the circuitry of at least one printed circuit.

9. Apparatus according to claim 6 wherein each shift register is arranged in circuit so as to have feedback and is subdivided into equally sized subshift registers, the outputs of the subshift register being arranged to supply the content of a subshift register in the form of elements of a Galois-field and wherein these elements are supplied to at least one matrix generator, the outputs of which are so arranged that at least two subkey matrices are supplied, the subkey matrices being supplied to a matrix multiplier the output of which provides a key matrix.

* * * * *